Dec. 10, 1935.    M. LEICHSENRING, JR    2,023,961
CONTROL MEANS FOR DRIVING AND DRIVEN ELEMENTS
Filed Jan. 2, 1932    2 Sheets-Sheet 1
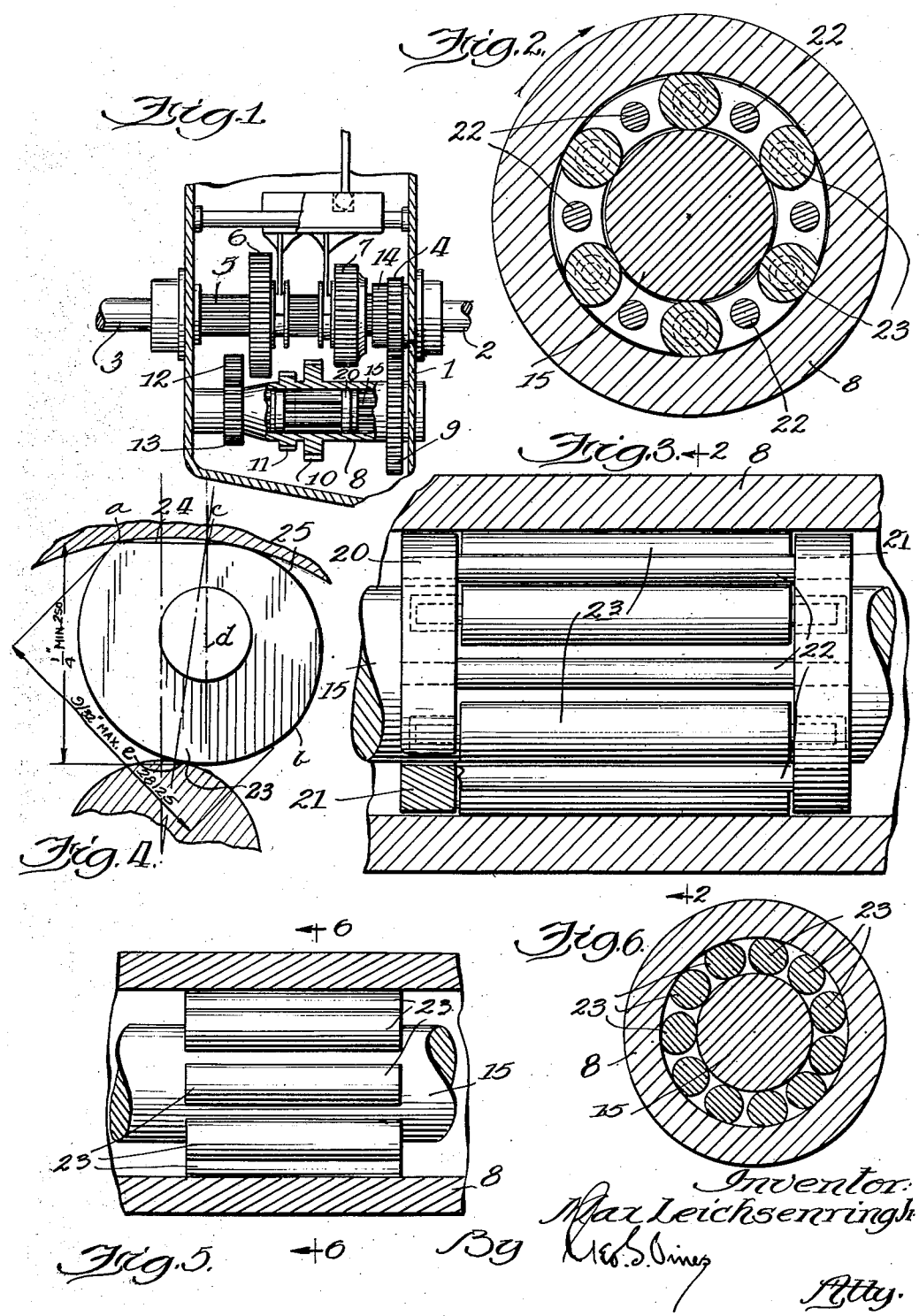

Dec. 10, 1935.   M. LEICHSENRING, JR   2,023,961
CONTROL MEANS FOR DRIVING AND DRIVEN ELEMENTS
Filed Jan. 2, 1932   2 Sheets-Sheet 2
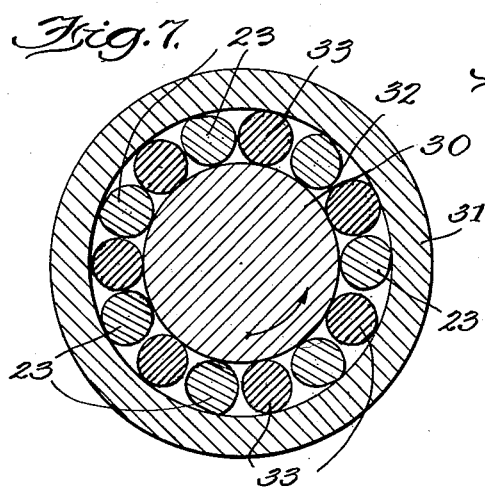
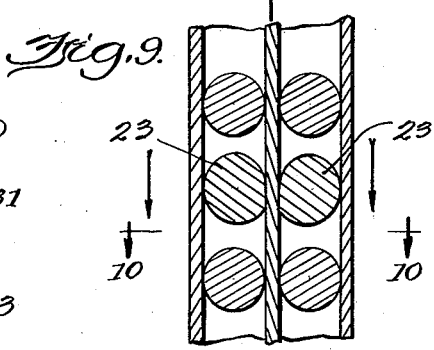
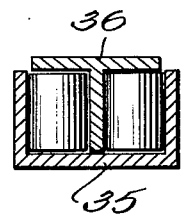
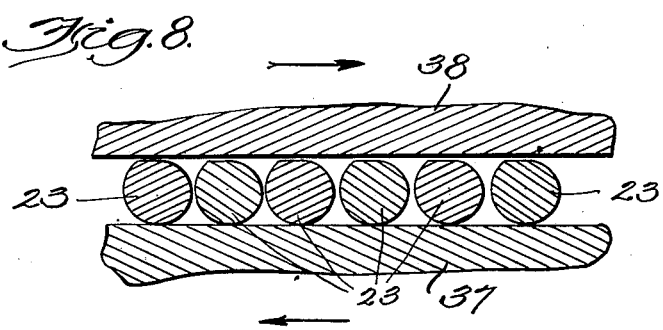
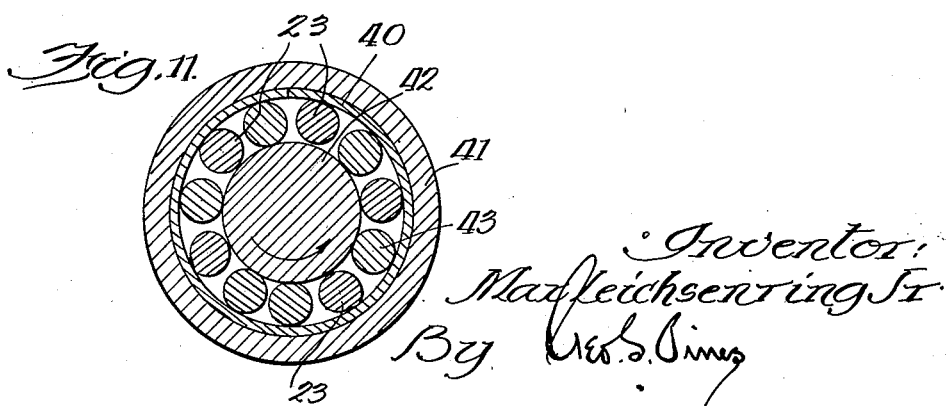
Inventor:
Max Leichsenring Jr.
By [signature]
Atty.

Patented Dec. 10, 1935

2,023,961

UNITED STATES PATENT OFFICE 2,023,961

CONTROL MEANS FOR DRIVING AND DRIVEN ELEMENTS

Max Leichsenring, Jr., Chicago, Ill.

Application January 2, 1932, Serial No. 584,457

16 Claims. (Cl. 192—41)

This invention relates generally to movement control mechanism for driving and driven elements, and has reference more particularly to a novel and improved means for automatically controlling the movement of driving or driven elements, such as a power shaft or the like, so as to lock or at least brake the driving or driven elements as the case may be.

The more important features of my invention may find expression in various types of machine elements, for example, the same may be incorporated in the drive shaft of a motor vehicle to act as an anti-reverse safety apparatus, as well as being capable of incorporation with the drive shaft of a motor vehicle for coupling the same to the driving shaft at certain predetermined times, in which case it will act as an overrunning clutch, which is commonly known as a "free wheel unit". My improved means may also be satisfactorily employed between any two relatively rotatable surfaces, such as clutch faces or the like, in which case the mechanism will be capable of preventing said surfaces from turning contrary to the direction for which they are set to turn.

So far as I am aware, it has been the practice by designers of mechanism of this type for use in an overrunning clutch, or in an anti-reverse safety apparatus, to provide tapered grooves or raceways between the friction faces, within which grooves or raceways are disposed round rollers, which rollers will permit relative rotation of the elements in one direction, but will be forced into the narrowed ends of their respective raceways when one of said elements is caused to move in a direction contrary to that for which it is set to turn. Certain prior art devices are exemplified in Lynch Patent #1,643,989 and my copending application, Serial #572,849, filed November 3, 1931, wherein are used round rollers disposed in tapered grooves or raceways, the cooperation of which is the important factor in the operation of the device.

In the use of round rollers disposed in tapered raceways, the braking or gripping surface is limited since the braking effect will take place only at predetermined points along the friction faces, resulting in undue strain at these points on the surfaces where the braking effect is taking place and often times causing either a distortion of said friction faces, or a complete pulverization of the round rollers.

I have found after considerable study and experimentation that many improvements can be made in a device of this character, and it is therefore the principal object of my invention to eliminate the special tapered grooves or raceways, thereby materially simplifying the entire construction of the device and reducing the cost of the same, while at the same time overcoming the difficulties above set forth.

It is a further object of my invention to do away with the tapered raceways and construct the device so that the space usually provided between the friction faces within which the tapered raceways are mounted may be utilized for housing a plurality of eccentric rollers, which rollers are so constructed that they will permit the rotation of one of the elements in one direction, but will prevent said element from turning in the reverse direction by a uniform camming action, thus producing a device that will meet to a greater extent than any device of which I am aware, the conditions which must be fulfilled in practice.

Another object of my invention is to provide an improved mechanism of the character described, comprising a driving and a driven element, between which elements are disposed a plurality of my improved eccentric rollers adapted for permitting relative movement of the elements in one direction, but preventing said elements from moving contrary to the direction for which they are set to move.

A still further object of this invention is to provide in a device of the character described novel and improved coupling means, comprising eccentric rollers which are adapted for disposition between two relatively rotatable members, said rollers being adapted to prevent said members from turning contrary to the direction for which they are set to turn.

A still further object of this invention is to provide a novel and improved device of the character described, especially adapted for coupling two relatively rotatable members, such for example as in an overrunning clutch or the like, including a plurality of eccentric rollers disposed between the two friction faces, said rollers being so shaped as to permit certain predetermined relative rotation in one direction, but preventing any relative movement in the reverse direction.

A still further object of this invention is to provide a novel and improved means especially adapted for use between two concentric cylindrical relatively rotatable members, said means being in the form of a roller having a portion of the periphery thereof provided with a cam surface so arranged as to permit relative rotation of said members in one direction, but to prevent movement of said members in a direction opposite to that for which they are set to move.

A still further object of this invention is to provide a novel and improved means for coupling two relatively rotatable members, said means comprising a roller being provided with a cam surface on a portion of the periphery thereof, which cam surface is so arranged as to permit the driving element to drive the driven element when the speed of the former is greater than that of the latter, but which will cause the driven element to be uncoupled from the driving element when the speed of the driven element is greater than that of the driving element.

A still further object of this invention is to provide a stationary shaft and a rotatable housing mounted on said shaft, the space between the shaft and housing being provided with the usual roller bearings, said bearings being spaced from each other and in which spaces are provided my improved rollers, on the periphery of which is provided a cam surface so arranged as to prevent said housing from rotating contrary to the direction for which it was set to rotate.

A still further object of this invention is to provide a rotatable shaft and stationary housing surrounding said shaft and spaced therefrom, within which space are provided the usual roller bearings, said bearings being spaced from each other so as to permit the insertion therebetween of my improved eccentric rollers, on the periphery of which is provided a cam surface so arranged as to prevent said shaft from rotating relative to said housing in a direction contrary to that for which it was set to rotate.

A still further object of this invention is to provide a novel and improved means for locking the friction surfaces to each other, said means including eccentric rollers, each having a cam surface provided on a portion of the periphery thereof, said cam surfaces being so arranged as to permit relative movement of said friction faces in one direction, but to wedge itself between said friction faces to prevent relative movement in a reverse direction.

A still further object of this invention is to provide an improved coupling means for locking a pair of concentric friction faces to each other, which consists of a plurality of eccentric rollers disposed around one of said friction faces and a split ring surrounding said eccentric rollers, each of said rollers having a cam surface provided on a portion of the periphery thereof, so arranged as to permit relative rotation of said friction faces in one direction, but to wedge themselves against the split ring for expanding the same to lock it to the other of said friction faces to brake or prevent relative rotation in the opposite direction.

With the foregoing and other objects in view, which will appear as the description proceeds, the invention consists in certain novel features of construction, arrangements and combination of parts, hereinafter more fully described, illustrated in the accompanying drawings and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings preferred embodiments thereof from an inspection of which, when considered in connection with the following description, my invention, its mode of construction and many of its advantages should be readily understood and appreciated.

Referring to the drawings, in which similar characters of reference are employed to indicate corresponding parts throughout the several figures of the drawings:

Figure 1 is a vertical section through a transmission in which my invention is embodied, parts thereof being broken away for the purpose of clearness;

Figure 2 is a sectional view taken on line 2—2 of Figure 3;

Figure 3 is an enlarged view of my improved locking means;

Figure 4 is an enlarged end view of one of my improved eccentric rollers;

Figure 5 is a view of a modified form of assembly of my improved rollers;

Figure 6 is a sectional view taken on line 6—6 of Figure 5;

Figure 7 is a sectional view through another modified form of assembly;

Figure 8 is a sectional view showing my improved eccentric rollers disposed between a pair of flat friction surfaces;

Figure 9 is a sectional view illustrating a further use for my improved rollers;

Figure 10 is a sectional view taken on line 10—10 of Figure 9;

Figure 11 is a sectional view through a still further modified form of assembly.

Referring to the drawings more specifically by characters of reference, the numeral 1 designates generally a transmission housing within which is journaled in the usual manner the drive shaft 2 and the driven shaft 3, these shafts being independently operable. The drive shaft is provided with a main drive gear 4, and the driven shaft 3 with a splined portion 5, with its inner end journaled in the usual manner in the drive gear 4. Slideably received on the splined portion 5 is the low and reverse sliding gear 6 and the high and second sliding gear 7. Journaled on the shaft 15, in the housing 1, parallel with the drive shaft, is the counter shaft cluster gear 8, with the gear 9 always in mesh with the main drive gear 4. In the cluster are gears 10 and 11 with which the sliding gears 7 and 6 respectively mesh when slid to their operative positions on the shaft 5. A reverse idler gear 12, with which the gear 6 meshes when shifted on the shaft 5, is journaled in the usual manner and is constantly in mesh with the gear 13 in the counter shaft cluster. The high and second speed sliding gear 7 is provided with a toothed socket which engages on the portion 14 of the main drive gear 4 when the gear 7 is shifted forward and provides a direct connection between the drive shaft 2 and driven shaft 3.

The transmission mechanism so far described is the common form of sliding gear transmission, the operation of which is well known to anyone skilled in the art, and as the same forms no part of the present invention, it is not thought necessary to describe it in more detail.

In the embodiment of my invention illustrated in Figures 1 to 7, my improved mechanism is shown embodied with the counter shaft cluster gear for preventing the gears 6 and 7 from rotating in a direction reverse to their normal direction of rotation when they are shifted into their operative positions.

To accomplish this I provide on a portion of the counter shaft 15, preferably on the central portion thereof, the assembly generally designated by the reference character 20, which assembly comprises a pair of rings 21 which are held in spaced relation to each other by means of the spacer bars 22, said spacer bars having their end portions secured in any suitable manner to the rings 21 for holding the same in a spaced relation. The rings 21 are also adapted for housing therebetween my improved eccentric rollers 23, said rollers being free to rotate within the ring members 21.

With reference to Fig. 4, each roller 23 preferably has its periphery developed in the following manner: Approximately half of the periphery or the portion thereof extending from the point indicated by the letter $a$ to the point indicated by the letter $b$ is formed on the arc of a circle of uniform radius. From the point $a$ to the point $c$ a relatively flat surface 24 is produced by developing this portion of the roller on a very wide radius. In some instances, as will hereinafter be explained, the surface 24 from $a$ to $c$ may be developed on a straight line. The portion of the periphery beginning with $c$ and terminating with $b$ is formed on a smooth curve of gradually increasing radius providing a cam surface 25. The diameter from $a$ to $b$ is, therefore, the largest diameter of the roller, while the diameter which includes the point $c$ and is indicated by the dotted line $d$ is the shortest diameter of the roller. In the specific form illustrated in Fig. 4, the maximum diameter is $\frac{9}{32}$ of an inch, while the smallest diameter is $\frac{1}{4}$ or 8/32 of an inch. Consequently, the surface portion $c$ to $b$ is so developed that the diameter increases $\frac{1}{32}$ of an inch over approximately one-third of the periphery of the roller.

Each roller is so dimensioned that the maximum diameter is greater than the radial distance between the opposed friction surfaces and the minimum diameter is almost (within a few thousandths of an inch) the same as said radial distance. When the roller is interposed between the friction surfaces, the points $a$ and $c$ bear against one of the friction surfaces. For example, in Fig. 2, the points $a$ and $c$ bear against the internal surface of the cluster gear 8. The shaft 15 consequently eccentrically engages the roller at one side of the smallest diameter of the roller as indicated at $e$. The three points of engagement are, therefore, on the same side of the smallest diameter.

The development and disposition of the eccentric rollers which have just been described produce the following operative results: On either side of the point $a$ the surfaces of the roller fall away quite sharply. Hence, supposing the cluster gear to be rotating clockwise, it is impossible for the point $a$ to move with the cluster gear to produce rotation of the roller since the point cannot produce a wedging action and because the off diameter position at which the shaft 15 engages the roller allows the roller to "drift" with the cluster gear. Upon a reversal of rotation of the cluster gear, it will be seen that the contact between the roller and the opposing cluster gear surface at point $c$ will cause the roller to be rotated by the moving friction surface and the tendency toward such rotating movement is assisted by the off diameter engagement between the roller and supporting shaft which prevents "drifting" movement of the roller. As a result, the cam surface 25 is moved to firmly wedge the roller between the two relatively moving friction surfaces thereby tightly locking said surfaces together.

It is believed important that the points $a$ and $c$ both engage the friction surface opposed thereto in order that proper operation of the device will result. Therefore, when the eccentric roller is interposed between two flat surfaces as shown in Figs. 8, 9 and 10, the surface 24 should be flat and when the roller is interposed between concentric surfaces, as in Figs. 2, 3, 5, 6, 7 and 11, the surface 24 should be so formed that the points $a$ and $c$ may contact the associated friction surface. Moreover, it has been found that the best results are obtained if the rise of the cam surface is an increase of approximately $\frac{1}{32}$ of an inch as, for example, from a minimum diameter of 8/32 of an inch, to a maximum diameter of $\frac{9}{32}$ of an inch, over a sector approximately equal to or slightly greater than 120° or one-third of the circumference. This is due to the fact that if the rise of the cam slope is substantially less, the roller will become so tightly wedged it becomes almost impossible to break the interlock, while if the rise is substantially greater the roller will slide instead of wedge.

It will be evident that, where a plurality of rollers are used, each roller acts entirely independently of every other roller and the rollers will, therefore, exert substantially equal gripping forces. Moreover, the gripping force will be uniformly distributed and distortion of either one of the friction surfaces cannot occur.

In the assembly illustrated in Figures 5 and 6, my improved rollers 23 are shown mounted in operative position between the shaft 15 and the housing 8 without the use of the mounting rings 21. In other words, these rollers 23 are loosely mounted between the shaft and housing. The operation of this assembly will be the same as that illustrated in Figures 1 to 3, said rollers being effective for preventing rotary motion of the housing 8 in a direction contrary to that for which it has been set to rotate.

In the embodiment illustrated in Figure 7 my improved eccentric roller is shown incorporated in a device wherein the shaft 30 is rotatable in an anti-clockwise direction and the housing 31 surrounding said shaft is stationary. In this embodiment it will be apparent that the rollers are so disposed as to permit rotation of the shaft in an anti-clockwise direction, but will prevent the same from rotating in the opposite direction. Rotation in the direction for which it is set to move will bring the flattened surfaces 24 of the rollers 23 in position to contact the inner periphery of the housing 31, whereas rotation in the opposite direction will move the rollers 23 in an anti-clockwise direction, bringing the cam surfaces 25 into play for wedging the rollers between the shaft and housing. In this embodiment I have also illustrated the use of a plurality of round roller bearings 33, which may be of the usual and well known construction, said roller bearings being interposed between my eccentric rollers to furnish the usual roller bearing for the shaft 30. By reason of this construction it will be noted that instead of said eccentric rollers surrounding only a portion of the length of the counter shaft, the said rollers 23 may extend across the full length of the shaft with a resulting increase of the gripping or braking surface that is brought into play when the device is caused to operate in the manner hereinabove described.

The embodiment illustrated in Figures 5 and 6 and also in Figure 7, may be incorporated in a free wheel or overrunning clutch, in which case both the shaft 30 and the housing 31 will be rotating in the same direction. When the speed of the shaft 30 exceeds that of the speed of the housing 31, the latter will be uncoupled from the shaft, whereas when the speed of the housing 31 exceeds that of the shaft 30 the rollers 23 will be brought into gripping position, in which position they will be effective in coupling the shaft 30 to the housing 31 so that the two will rotate as a unit. Thus coupled, the rotation will take place until such time as the speed of the shaft 30 again exceeds that of the housing 31, at which time the two will be again uncoupled.

The advantages of this type of overrunning or free wheel clutch over the type heretofore used should be readily apparent, as not only is the necessity for providing the tapered grooves or raceways eliminated, but also a more uniform coupling action is obtained over a larger surface.

In the embodiments illustrated in Figures 9 and 10 my improved rollers are shown incorporated in an elevator rail construction, said rollers 23 being so disposed between the member 35 and T-rail 36 as to permit the latter to move in an upward direction relative to the former, but to prevent the T-rail from moving in the opposite direction. This is the form of anti-reverse safety device which may be adapted for use in many instances, the one shown in the drawings being only an exemplification of one of many of such uses.

In the embodiment illustrated in Figure 8, my improved rollers are shown incorporated between a pair of plane surfaces, such for example as the plate members 37 and 38, said plate members being permitted to move relative to each other in the direction indicated by the arrows, but will be prevented from moving in the opposite directions by the wedging action of the rollers 23. As explained in connection with the other figures, the embodiment illustrated in Figure 8 may be used for either completely braking one of the members relative to the other, or for coupling the two together to act as a unit, whereby one of said members will be caused to drive the other of said members when moving in one direction and to be uncoupled or disconnected from each other when the relative movement is reversed.

In the embodiment illustrated in Figure 11, I have shown incorporated with my improved eccentric rollers a split ring 40, which is disposed in position to surround the rollers 23, said split ring in its normal position being permitted to rotate within the housing 41 when the shaft 42 is rotating in the direction shown by the arrow in that figure.

However, when said shaft 42 attempts to rotate in the reverse direction it will actuate the rollers 23 to bring them into a wedging position, in which position they will engage the inner surface of the split ring 40 to cause the same to expand and to force it against the inner periphery of the housing 41, thereby locking the housing to the shaft to prevent further movement in the reverse direction of the latter. By providing the split ring 40 it will be noted that a more gradual braking action is obtained. This is due to the fact that the rollers will act on the split ring to expand the same, instead of directly engaging the housing 41. In the embodiment illustrated in Figure 11 I have also shown a plurality of roller bearings 43, which roller bearings will take the place of the roller bearings usually provided between the shaft and the housing where one rotates relative to the other, thus making it possible to dispose my improved means within the space usually provided for housing the roller bearings alone.

From the above it should be apparent that my improved eccentric roller is especially adapted for use as an anti-reverse safety apparatus where the shaft is stationary and the housing surrounding said shaft is rotatable, or where the shaft is rotatable and the housing surrounding the shaft is stationary. These rollers are also adapted for incorporation in an overrunning or free wheel clutch, in which case both the shaft and housing are rotating in the same direction and when the shaft rotates slower than the housing rotation is free, whereas when the shaft tends to rotate at a greater speed than the housing the eccentric rollers will be brought into a wedging position to couple the housing to the shaft to cause the two to rotate as a unit.

Similarly, by reversing the position of the eccentric rollers with both the shaft and housing rotating in one direction, when the housing tends to rotate faster than the shaft the rollers will be brought into gripping engagement and carry the shaft along with the housing at the same speed.

From what has been set forth it will be seen that my improved eccentric rollers may be assembled in operative position without necessitating the use of any tapered grooves or raceways and will be effective for imparting a uniform gripping effect on the driving or driven element as the case may be. Attention is also directed to my improved assembly wherein the same means employed for holding the roller bearings in assembled position may also be utilized for mounting the eccentric rollers, with the result that a much more simplified and economical construction may be had. The latter feature also makes it possible to mount my improved wedging means in a limited space, such for example as on the counter shaft of a transmission without in any way diminishing the area of the braking surface. In the devices heretofore used the major portion of the area between a pair of clutch faces is taken up by the member within which the tapered raceways are provided with the result that the rollers disposed in said tapered raceways were of necessity relatively small and therefore ineffective in operation. The elimination of these raceways makes it possible to use not only eccentric rollers of much larger diameters, but also a greater number of said rollers may be mounted in a much smaller space.

It is believed that my invention, its mode of construction and assembly and many of its advantages should be readily understood from the foregoing without further description, and it should also be manifest that while preferred embodiments of the invention have been shown and described for illustrative purposes, the structural details are, nevertheless capable of wide variation within the purview of my invention as defined in the appended claims.

What I claim and desire to secure by Letters Patent of the United States is:—

1. In a device of the character described, the combination of two concentric cylindrical members, the adjacent faces of which constitute friction faces, rotatable wedging means between said friction faces, including an eccentric roller on a portion of the periphery of which is formed a cam surface, and a flattened portion, said flattened portion being disposed against one of said friction faces.

2. In a device of the character described, the combination of two concentric cylindrical members, the adjacent faces of which constitute friction faces, a pair of spaced rings surrounding the inner one of said members, eccentric rollers mounted in said rings, each of said rollers being provided with a cam surface and a flattened portion on a portion of the periphery thereof, said cam surfaces being adapted to wedge themselves between said friction faces for preventing relative movement of said members in a direction contrary to that for which it was set to move, and said flattened portions being disposed for contacting engagement with the outer of said friction faces.

3. In a device of the character described, the combination of two concentric cylindrical members adapted to rotate one upon the other and the adjacent faces of which constitute friction faces, a pair of spaced ring members mounted on the inner of said members, said ring members having mounted therein circumferentially spaced rollers, and eccentric rollers also mounted in said ring members and interposed between said roller bearings, said eccentric rollers having their outer peripheries so shaped as to prevent said concentric members from rotating in a direction contrary to that for which they are set to rotate, and being adapted for acting both independently of each other and of said roller bearing.

4. As a new article of manufacture, an eccentric roller adapted for use between the clutch faces of a free wheel clutch, having a portion of the periphery thereof provided with a relatively flattened surface, another portion of the periphery thereof being formed on the arc of a circle of uniform radius, and a further portion of the periphery thereof being formed on an arc of gradually increasing radius to provide a cam surface, said cam portion connecting one end of said flattened portion with one end of said circular portion, the point of juncture between said flattened and cam portions being the lowest point on the periphery of said roller.

5. In a device of the character described, the combination of relatively opposed movable members having opposed gripping surfaces, and an intermediate gripping roller therebetween having spaced peripheral points engaging said surfaces in a triangular relationship, said points being located on the same side of the roller diameter of minimum length.

6. In a device of the character described, the combination of relatively movable members having opposed gripping surfaces, and an intermediate gripping roller therebetween having two circumferentially spaced points engaging one of said surfaces.

7. In a device of the character described, the combination of relatively movable members having opposed gripping surfaces, and an intermediate gripping roller therebetween having two spaced points engaging one of said surfaces, one of said points being formed as a shoulder so disposed as to prevent rotational movement of said roller when said surface moves in one direction.

8. In a device of the character described, the combination of relatively movable members having opposed gripping surfaces, and an intermediate gripping roller therebetween having spaced points thereon for engagement with one of said surfaces, one of said points being fashioned to prevent rotation of the roller under one condition of relative movement of said members, said roller having a cam surface rising from the other of said points and movable into contact with said surface upon an opposite condition of relative movement of said members.

9. In a device of the character described, the combination of relatively movable members having opposed friction surfaces, and an interposed element between said surfaces, said element having a normal three-point engagement with said surfaces maintaining said element inoperative and allowing it to move with one of said surfaces when the members have a predetermined relative movement, and having a cam surface movable to supplant two of the three points of engagement and thereby interlock said parts upon a reverse relative movement of said members.

10. A roller element for use in mechanism of the character described comprising, in combination, a member having a peripheral surface of generally cylindrical shape, said surface having a portion formed on a constant radius and extending throughout approximately one-half the periphery of said element, said portion terminating at one end in a relatively sharp shoulder provided by forming a second peripheral portion on a radius which is substantially greater than said first mentioned radius so that said second portion is relatively flat, said second portion extending approximately one-sixth of the periphery of said element, the remaining peripheral surface of said element being formed on a radius of gradually increasing length to provide a cam surface.

11. A roller element for use in mechanism of the character described comprising, in combination, a member having a peripheral surface of generally cylindrical shape, said surface having a cam face thereon extending through approximately one-third of the circumference and formed on an increasing radius which varies approximately one thirty-second of an inch in that distance.

12. As a new article of manufacture, an eccentric roller adapted for use between a pair of adjacent friction faces or the like, comprising a flattened surface on a portion of the periphery thereof, another portion of the periphery of said roller being formed on an arc of a circle of uniform radius, and a still further portion of said periphery being formed on a curve of a gradually increasing radius to provide a cam surface, said flattened surface being adapted for normal disposition against one of the friction faces.

13. In a device of the character described, the combination of spaced concentric and relatively movable members presenting opposed inner and outer surfaces, and eccentric rollers loosely disposed between said surfaces, said eccentric rollers being developed to produce a peripheral part on each for engagement with said outer surface to prevent rotative movement of said rollers upon relative movement of said surfaces in one direction, each of said rollers being eccentrically disposed between said surfaces to locate the contacts thereof with said inner and outer surfaces on the same side of the minimum diameter of the roller, whereby when relative movement of the surfaces occurs in said one direction the rollers will drift without rotation between the surfaces and will be rotated when said surfaces move relatively in the opposite direction, and said rollers having another peripheral portion shaped to provide a gently rising cam surface which is movable by such rotation of said rollers between said surfaces to prevent further relative movement.

14. In a device of the character described, the combination of spaced concentric and relatively movable members presenting opposed inner and outer surfaces, and eccentric rollers loosely disposed between said surfaces, said eccentric rollers being developed to produce a peripheral part on each for engagement with said outer surface to prevent rotative movement of said rollers upon relative movement of said surfaces in one direction, each of said rollers being eccentrically disposed between said surfaces to locate the contacts thereof with said inner and outer surfaces on the same side of the minimum diameter of the roller, whereby when relative movement of the surfaces occurs in said one direction the rollers will drift without rotation between the surfaces and will be rotated when said surfaces move relatively in the opposite direction, and said rollers having another peripheral portion adjoining said peripheral part and shaped to provide a gently rising cam surface which is movable by such rotation of said rollers between said surfaces to prevent further relative movement, the initial and lowest portion of said cam surface being approximately flat for opposition to said outer surface to prevent independent movement of said rollers when the device is idle.

15. A roller element for use in mechanism of the character described comprising a member having two circumferentially spaced points thereon for normal engagement with circumferentially spaced points on a friction surface opposed thereto, the surface on the outer side of one point sloping relatively sharply therefrom and the surface from the outer side of the other point being a rising cam face.

16. A roller element for use in mechanism of the character described comprising a member having two circumferentially spaced points thereon for normal engagement with the same opposed friction surface, the surface of said member sloping away from one point and rising as it slopes to provide a cam face.

MAX LEICHSENRING, Jr.